Figure 1A:
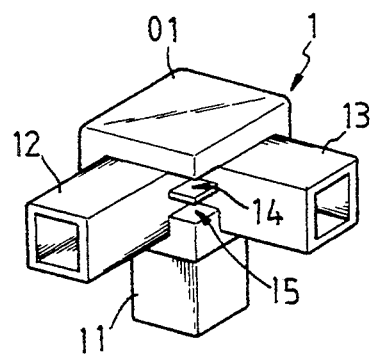
Figure 1B:
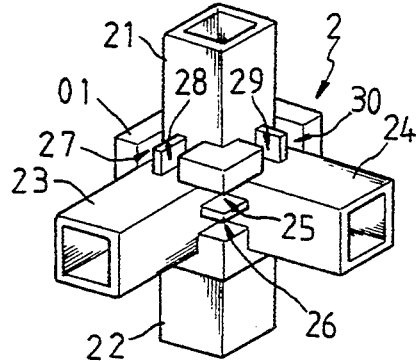
Figure 1C:
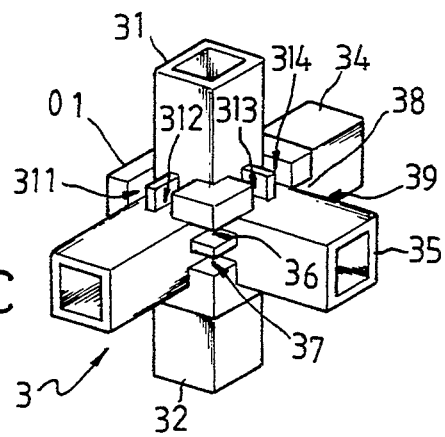
Figure 1D:
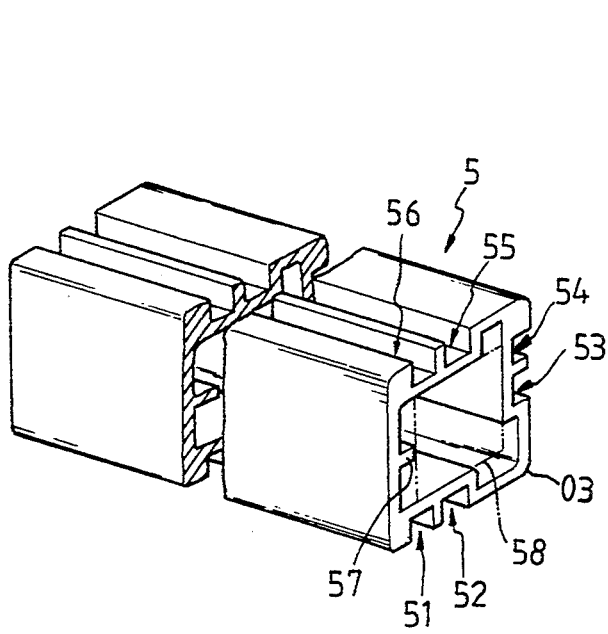
Figure 1E:
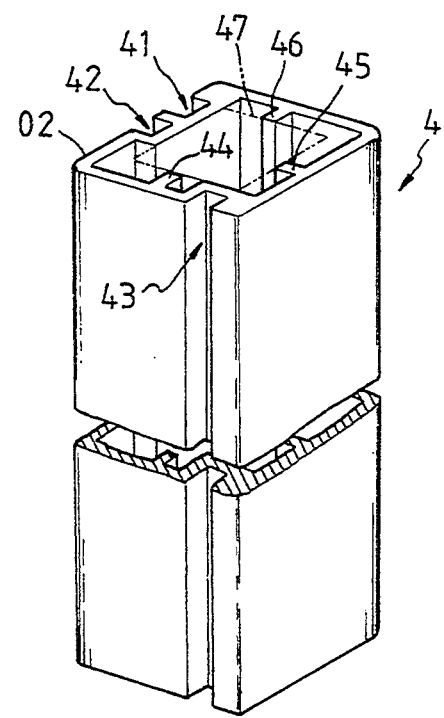

United States Patent [19]

Chern

[11] Patent Number: 5,423,604
[45] Date of Patent: Jun. 13, 1995

[54] MODULAR CABINET FRAME STRUCTURE

[76] Inventor: Chen-Tsung Chern, No. 23, Lane 32, Wuu Chyuan Street, Baan Chyau City, Taiwan, Prov. of China

[21] Appl. No.: 112,910

[22] Filed: Aug. 27, 1993

[51] Int. Cl.6 ............................................. A47B 47/04
[52] U.S. Cl. ............................ 312/265.1; 312/265.2; 312/265.4; 312/265.5
[58] Field of Search ................. 312/265.1, 265.2, 265.4

[56] References Cited

U.S. PATENT DOCUMENTS

| | | | |
|---|---|---|---|
| 3,272,582 | 9/1966 | Anderson et al. | 312/265.4 |
| 3,779,177 | 12/1973 | Gigante | 312/257.1 X |
| 5,003,741 | 4/1991 | Yeh | 312/265.1 X |
| 5,046,791 | 9/1991 | Kooiman | 312/265.1 |

Primary Examiner—Kenneth J. Dorner
Assistant Examiner—Rodney B. White
Attorney, Agent, or Firm—Pro-Techtor International

[57] ABSTRACT

One type of modular cabinet frame structure is primarily made up of two square cross sectional tubes with three connectors; the surfaces of the two tubes are equipped with inset joining grooves to meet the needs of different types of arrangements; the interior of the tubes are equipped with projecting strengthening ribs for upright structures that cause the center of the hollow interior of the tubes to overlap with the center of the tubes. The connectors consist of square units upon the surface of which are mounted three, four or five tenon posts that can be inserted in the tubes described above and form different types of connections in various directions.

3 Claims, 6 Drawing Sheets

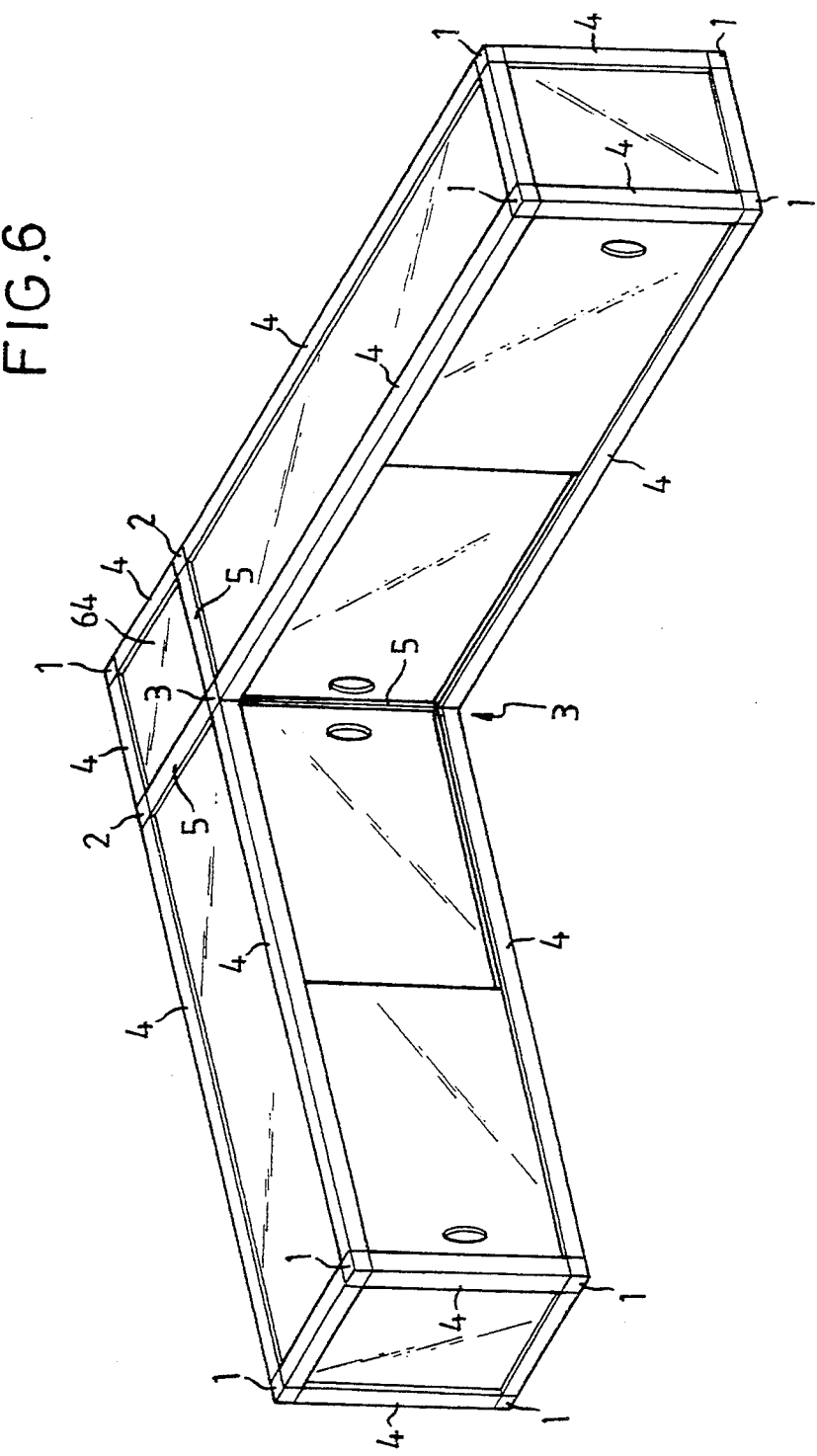

MODULAR CABINET FRAME STRUCTURE

Description of Contrivance (1)

In general, cabinets are constructed using nails or other fasteners. Because of this, moving these kinds of cabinets can be awkward and time consuming. The problem also arises that the size of these cabinets frequently exceeds the size of the door of many apartments and residences and therefore they cannot be brought in. Therefore, the makers of this contrivance have used their knowledge and experience to use combinations of two kinds of square tubing and three kinds of multi-directional joints in creating multi-function, variable form modular cabinets. These cabinets not only resolve the problems of awkward weight and size, but also can be assembled into different shapes in order to satisfy one's personal needs or coordinate with the layout of a particular location. They are also very suitable for promoting the DIY market. Concerning the detailed structure of these cabinets, please consult the following diagrams and explanation.

One type of modular cabinet frame structure consists primarily of three-way multi-directional joints 1., four-way multi-directional joints 4., five-way union multi-directional joints 3., corner sleeves 4., and butt joint sleeves 5. (shown in FIG. 1). A description of the structure of these components is as follows:

Three-way multi-directional joint 1

This consists of a cubic structure 01., from which, at the center of two contiguous horizontal faces, square tenon posts of identical size 13., 14. extend at right angles to the face. In addition, from the corresponding center of the bottom face of 01., the square tenon post 11., of identical size to 13. and 14., extends at a right angle to the face. At the corner of the cube 01. between the faces containing the tenon posts 12. and 13., are located the two identical width "L"-shaped shelf insertion slots 14., 15. Furthermore, between tenon posts 12. and 13. and tenon post 11. are bored out shelf insertion slots identical with 14. and 15. (not illustrated in diagram).

Four-way multi-directional joint 2

This consists of a cubic structure 01., from which, at the center of two contiguous horizontal faces, square tenon posts 23., 24. of size identical to 13. and 14. extend at right angles to the face. In addition, from the corresponding centers of the upper and lower faces of cube 01., square tenon posts 21., 22., identical in size with 12. and 13., extend at right angles to the face. On one corner of cube 01. adjacent to the faces containing tenon posts 23. and 24., are located the identical width "L"-shaped shelf insertion slots 25. and 26. At the corners between tenon post 21. and tenon post 23. and 25. are located insertion slots 27., 28., 29., and 30., identical to 14. and 15. At the corners between tenon post 22. and tenon posts 23. and 24. are also located insertion slots of identical size (not illustrated in diagram).

Five-way union multi-directional joint 3

This consists of a cubic structure 01., from which, at the center of two contiguous horizontal faces, square tenon posts 33., 34. and 35., of size identical to 12. and 13., extend at right angles to the face. In addition, from the corresponding centers of the upper and lower faces of cube 01., square tenon posts 31. and 32., identical in size with 12., extend at right angles to the face. On two adjacent corners of cube 01.—these are the corners between tenon post 35. and tenon posts 34. and 33.—are located the identical width "L"-shaped shelf insertion slots 36., 37. and 38. 39. Furthermore, on the corners between tenon post 31 and tenon posts 33. and 35. are located the insertion slots 311., 312 and 313, 314, and on the corners between tenon post 31. and tenon post 34. and between tenon post 32. and tenon posts 33., 34., and 35. are also located insertion slots (not illustrated in diagram).

Corner sleeves 4

These are elongated rectangular tubes (base tubes 02.) that are equivalent in cross sectional area to cubic structure 01. On two adjacent faces there are the rectangular cross-section inset joining grooves 43. and the parallel paired grooves 41. and 42. Inset joining grooves 41. and 43. are symmetrically placed at equal distances from the corner of the two adjacent faces. On three sides of the interior of base tube 02., with the exception of the side containing inset joining grooves 41. and 42., are mounted projecting strengthening ribs 44., 45. and 46. These ribs enable the central point of the interior space of base tube 02. to correspond to the center of base tube 02., and at the same time allow the ribs =44., 45., 46. and the thickness of material at the base of groove 41, and 42, to limit the amount of space for insertion 47. that remains so that a snug fit is formed with the insertion of tenon post 12.

Butt joint sleeves 5

These are elongated tubes (base tube 03.) that are equivalent in cross section to cubic structure 01. On three adjacent faces are cut the parallel paired rectangular cross-section inset joining grooves 51. and 52., and 56. and 55., symmetrically placed opposite each other, along with paired grooves 54. and 53., which are located at a distance identical to that of 51. and 52. from the corner adjacent to their two adjoining faces. In addition, in the interior of base tube 03., on the face which does not contain an inset joining groove, is mounted the projecting strengthening rib 57., which enables the central point of the interior space of base tube 03. to correspond to the center of base tube 03. At the same time, rib 57. and the thickness of material at the base of the grooves on the other three faces allows the amount of space 47. to be limited so that a snug fit will be formed with the insertion of tenon post 12.

Finally, modular cabinets with many uses can be assembled from the five types of components described above according to the imagination of the user. In the example shoe cabinet suitable for use at home (shown in FIG. 2), the outer frame uses all three-way multi-directional joints 1. connected with inserted corner sleeves 4. The top, bottom and sides of the cabinet all are constructed using side closing panels 61., table panels 6. and bottom panels 63. inserted in inset joining grooves 43. The front face uses inset joining grooves 41. and 42 to mount door panels 62A. and 62B. The partitioning arrangement inside the cabinet employs four-way multi-directional joints 2. together with the partition panels inserted in the space created by butt sleeves 5. and the corner sleeves 4. on two sides to create a series of shoe cabinet units.

Figure 3:
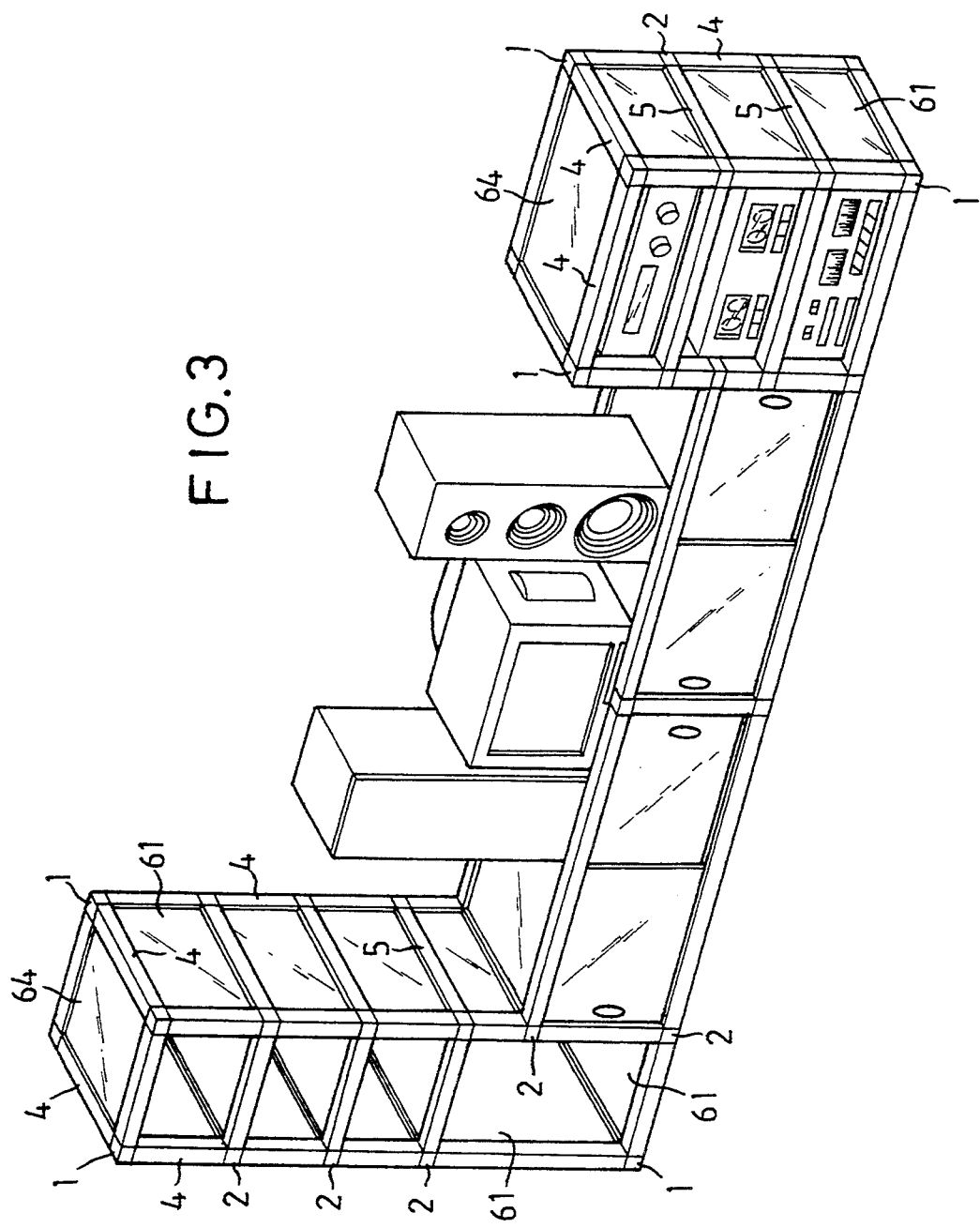

Rearranging the components to meet different needs, a household audiovisual center (as shown in FIG. 3) can also be created. This employs the basic structure of the shoe cabinet, but the three-way multi-directional joints 1. used on the sides of the cabinet are replaced with four-way multi-directional joints 2. and the vertical corner sleeves 4. are replaced with butt joint sleeves 5. This enables the addition above and to the side of corner sleeves 4., four-way multi-directional joints 2. and three-way multi-directional joints 1. to form a vertical cabinet frame. Side closing panels 61. are inserted in the cabinet frame side and back and shelf panels 64. are used to partition the storage levels. Bottom panels 63. are slid into grooves on the bottom of structure to complete the assembly of the audiovisual center. The front face of the cabinet frame does not use inserted side closing panels 61. and therefore the inset joining grooves 41. on the corner sleeves 4. of the front face have inserted side closing panels 61o on the sides, causing the inset joining grooves 43. on the front to be revealed and forming a series of cabinet compartments on the sides.

Meeting a different set of needs, a rectangular collector's cabinet can be created (shown. in FIG. 4) and this uses the shoe cabinet form as the basic structural component. In this case the three-way multi-directional joints 1. on the upper periphery are replaced with four-way multi-directional joints 2. and corner sleeves 4. on the upper periphery are replaced with butt joint sleeves 5. to connect in the upward direction with corner sleeves 4. and four-way multi-directional joints 2. In addition, butt joint sleeves 5. are connected on all four sides, creating a multi-level cabinet frame and accommodating the insertion of side closing panels 61., door panels 62A. and 62B. and shelf panels 64., etc. On the uppermost level, three-way multi-directional joints 1 and corner sleeves 4. are assembled, providing support for table panel 6. Door panels 62A. and 62B. slide on inset joining grooves 55., 56. and 51., 52. or 41., 42., but for different applications, door panels 62A. and 62B. may be exchanged for pivoting rectangular doors 65A. and 65B. These utilize hinge assemblies 71. and 72. (inner button) which are fastened to the corner sleeves 4. of both sides and the insertion area of the upper and lower tenon posts 22. and 21. Passing through the corner sleeves 4., the hinge assemblies are fastened into the tenon posts 21. and 22.

To meet yet another set of needs, a display case for general use can be assembled (shown in FIG. 5) and this utilizes the collector's cabinet frame as a basic structure, but removes all components such as side sealing panels 01., table panels 6., door panels 62A. and 62B., pivoting rectangular doors 65A, and 65B. and shelf panels 64. In this way a completely empty display case is created.

To coordinate with another style of indoor furnishing, the modular cabinet can be arranged as a cabinet that goes around a corner (shown in FIG. 6). This arrangement utilizes the basic shoe cabinet unit as a basic component and replaces the upper and lower front three-way multi-directional joints of one side with five-way union multi-directional joints 3., and the upper and lower rear three-way multi-directional joints on the same side with four-way multi-directional joints 2. The corner sleeves 4. on the same side are all replaced with butt joint sleeves 5., allowing three-way multi-directional joints and corner sleeves 4. diagonally opposite from the five-way union multi-directional joints to connect with the replacement four-way multi-directional joints 2. and supporting shelf 64. This finally causes the two shoe cabinets to be joined forming a right angle corner-rounding unit.

The above explanation adequately shows that a simple assortment of five kinds of components can function to create cabinets with many shapes and because there is only a limited number of components, stock management can be simplified and quality control made more stable. Additionally, this contrivance can be fashioned from extruded plastic waste separated from recycled materials and the surface can be painted or decorated with an adhesive membrane. Therefore this contrivance—the Modular Cabinet Frame Structure—can not only be assembled to meet the needs of a particular situation, but because it is practical and has a simple and easily understood structure, can also be used for promoting DIY.

DIAGRAMS

FIG. 1: Schematic diagram of the components of this contrivance.

Figure 2:
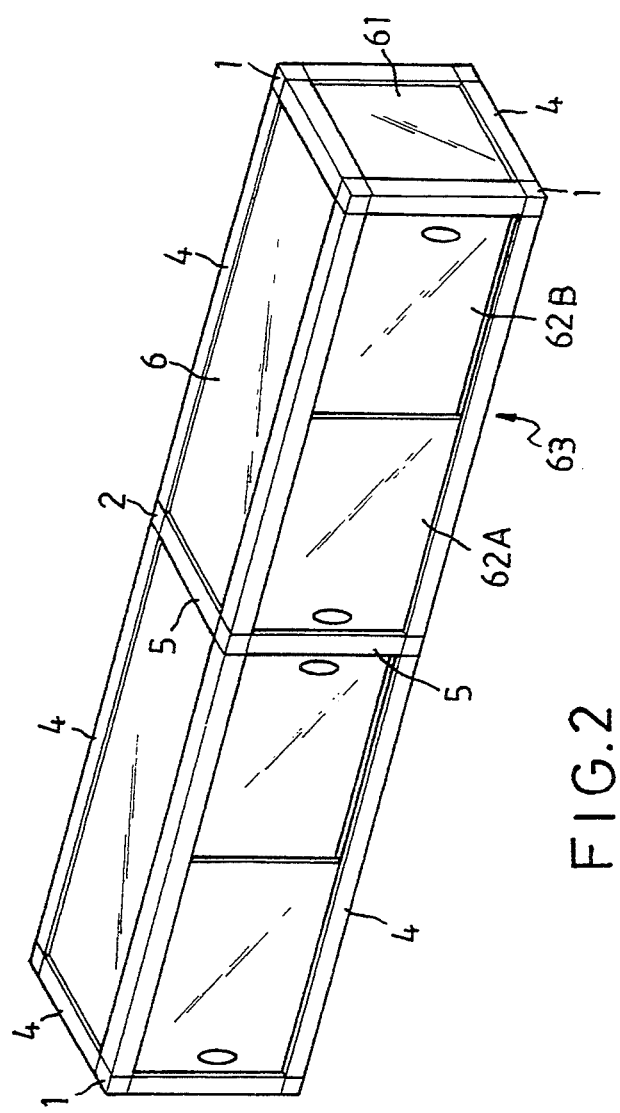

FIG. 2: Diagram of the first sample application of this contrivance.

FIG. 3: Diagram of the second sample application of this contrivance.

Figure 4A:
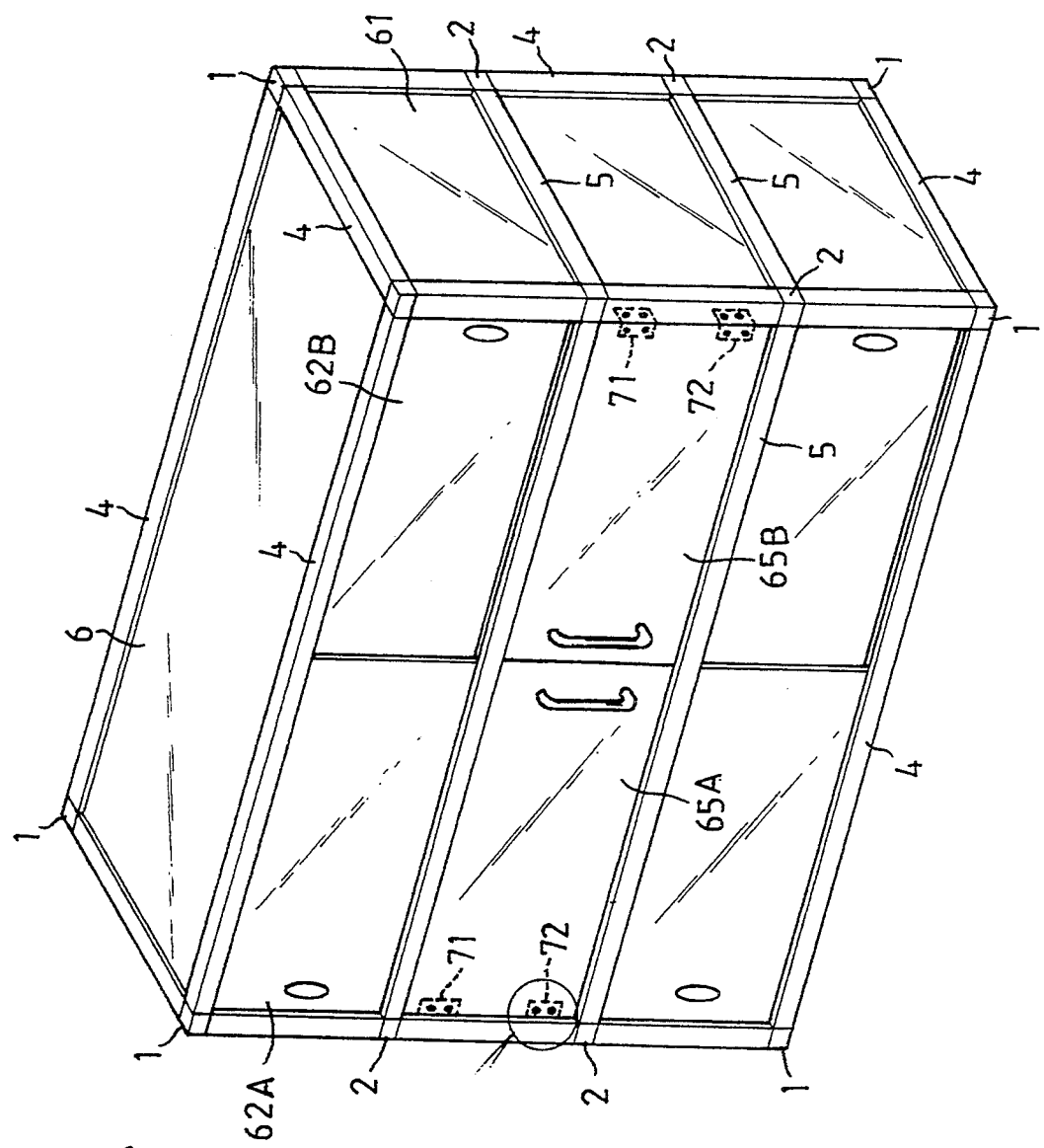
Figure 4B:
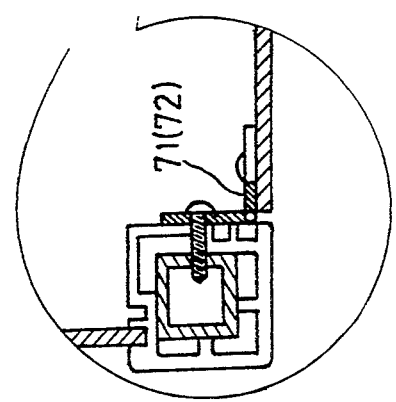

FIG. 4: Diagram of the third sample application of this contrivance.

Figure 5:
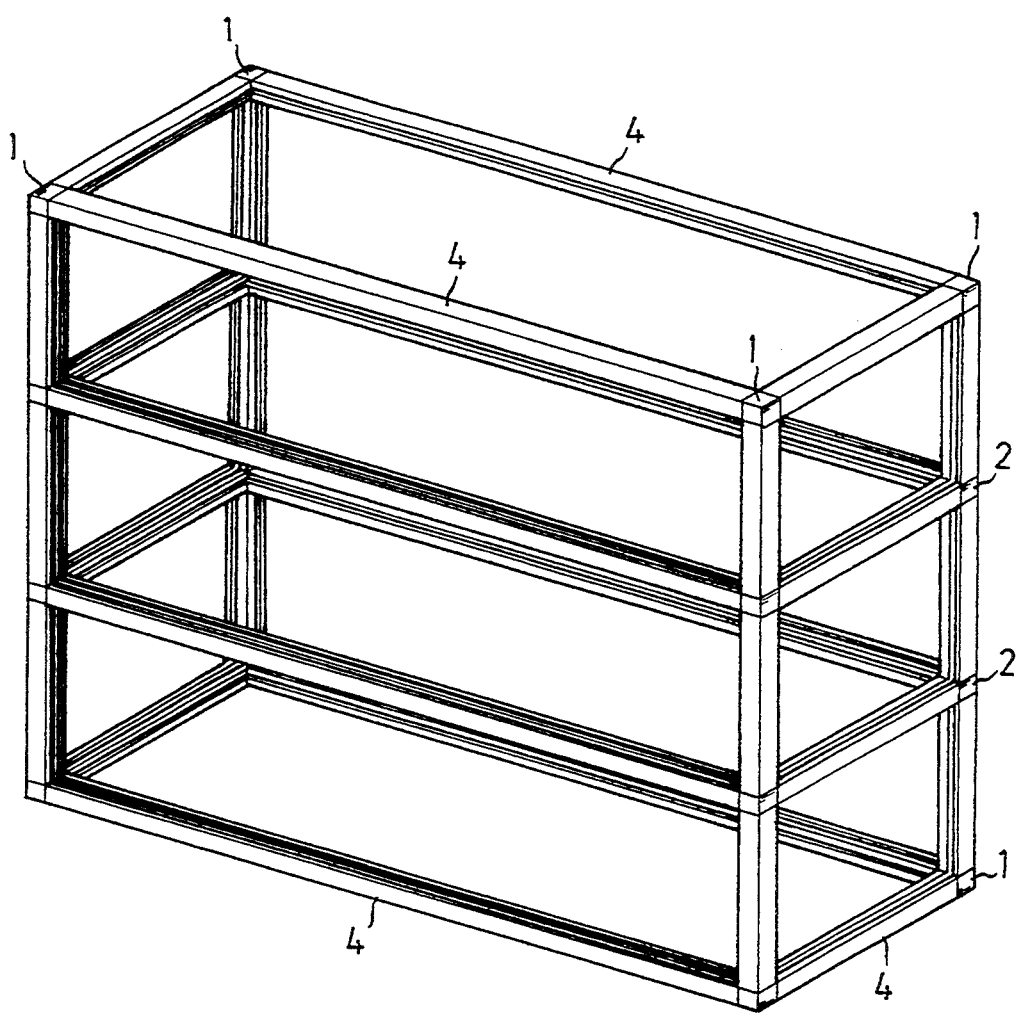

FIG. 5: Diagram of the fourth sample application of this contrivance.

FIG. 6: Diagram of the fifth sample application of this contrivance.

01. Cubic structure
02. Base tube
03. Base tube
1. Three-way multi-directional joint
2. Four-way multi-directional joint
3. Five-way union multi-directional joint
11. 12. 13. 21. 22. 23. 24. 31. 32. 33. 34. 35. tenon posts
14. 15. 25. 26. 27. 28. 29. 30. 36. 37. 38. 39. 311. 312. 313. 314. shelf insertion slots
4. corner sleeves
5. butt joint sleeves
41. 42. 43. 51. 52. 53. 54. 55. 56. inset joining grooves
44. 45. 46. 57. strengthening ribs
47. 58. space for tenon insertion
6. top panel
61. side closing panel
62A., 62B. door panel
63. bottom panel
64. shelf
65A., 65B. Pivoting door
71., 72. hinge assembly

I claim:

1. A modular cabinet frame structure comprising:
   a multi-directional joint component comprising a central cubic structure with at least three square tenon posts extending from faces of said cubic structure;
   a corner sleeve component comprising a first elongated rectangular base tube including cross section inset joining grooves on a first face of said base tube, and parallel paired grooves on a second, adjacent face of said base tube; and
   a butt joint sleeve component comprising a second elongated rectangular base tube including parallel paired grooves on three faces of said base tube; wherein
   said multi-directional joints are used to join said corner sleeve components and said butt joint sleeve components so as to enable a user to form the desired modular cabinet structure, and wherein said parallel paired grooves and said inset joining grooves receive closing elements to form enclosures if so desired by the user of the structure.

2. The modular cabinet frame structure of claim 1 wherein:

said elongated rectangular base tubes include in their interiors projecting strengthening ribs.

3. The modular cabinet frame structure of claim 1 wherein:

said closing elements comprise closing panels, partitions, sliding doors, pivoting doors, and shelf panels.

* * * * *